(12) United States Patent
Pettersson et al.

(10) Patent No.: US 10,390,038 B2
(45) Date of Patent: Aug. 20, 2019

(54) METHODS AND DEVICES FOR ENCODING AND DECODING VIDEO PICTURES USING A DENOISED REFERENCE PICTURE

(71) Applicant: TELEFONAKTIEBOLAGET LM ERICSSON (PUBL), Stockholm (SE)

(72) Inventors: Martin Pettersson, Vallentuna (SE); Kenneth Andersson, Gävle (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 247 days.

(21) Appl. No.: 15/026,928

(22) PCT Filed: Feb. 17, 2016

(86) PCT No.: PCT/SE2016/050123
§ 371 (c)(1),
(2) Date: Apr. 1, 2016

(87) PCT Pub. No.: WO2017/142449
PCT Pub. Date: Aug. 24, 2017

(65) Prior Publication Data
US 2018/0054628 A1 Feb. 22, 2018

(51) Int. Cl.
*H04N 11/02* (2006.01)
*H04N 19/53* (2014.01)
(Continued)

(52) U.S. Cl.
CPC ........... *H04N 19/53* (2014.11); *H04N 19/172* (2014.11); *H04N 19/182* (2014.11); *H04N 19/54* (2014.11);
(Continued)

(58) Field of Classification Search
CPC .................................................... H04N 19/53
(Continued)

(56) References Cited

U.S. PATENT DOCUMENTS

| | | | |
|---|---|---|---|
| 4,606,069 A | * | 8/1986 | Johnsen .............. H04N 1/4115 382/218 |
| 6,516,031 B1 | * | 2/2003 | Ishihara ................ H04N 5/145 348/E5.066 |

(Continued)

FOREIGN PATENT DOCUMENTS

| | | |
|---|---|---|
| EP | 1 094 669 A1 | 4/2001 |
| EP | 1 809 040 A2 | 7/2007 |
| EP | 1919223 A1 | 5/2008 |

OTHER PUBLICATIONS

Kamp, S., et al., "Decoder-Side Motion Vector Derivation for Block-Based Video Coding" IEEE Transactions on Circuits and Systems for Video Technology, vol. 22, No. 12, Dec. 2012, pp. 1732-1745.

(Continued)

*Primary Examiner* — Leron Beck
(74) *Attorney, Agent, or Firm* — Rothwell, Figg, Ernst & Manbeck, P.C.

(57) ABSTRACT

A method is disclosed performed in an encoder for encoding video pictures into a video bit stream, the method comprising: obtaining a denoised version of a reference picture; performing a matching procedure at least once, the matching procedure comprising matching a reference matching area of the reference picture to a matching area of a second picture and matching a reference matching area of the denoised version to the matching area of the second picture, and encoding a block of a current picture by selecting, for the block, a first prediction area based on a first reference area of the reference picture or a second prediction area based on a second reference area of the denoised version, wherein the prediction area having lowest matching error to the corresponding matching area of the second picture is selected. A corresponding method in a decoder is disclosed, and (Continued)

encoder, decoder, computer programs and computer program products.

33 Claims, 6 Drawing Sheets

(51) Int. Cl.
| | |
|---|---|
| *H04N 19/54* | (2014.01) |
| *H04N 19/567* | (2014.01) |
| *H04N 19/577* | (2014.01) |
| *H04N 19/172* | (2014.01) |
| *H04N 19/182* | (2014.01) |
| *H04N 19/80* | (2014.01) |
| *H04N 19/85* | (2014.01) |

(52) U.S. Cl.
CPC ......... *H04N 19/567* (2014.11); *H04N 19/577* (2014.11); *H04N 19/80* (2014.11); *H04N 19/85* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 6,678,426 B1* | 1/2004 | Bearss | ............... | G06K 15/02 358/1.2 |
| 2007/0092110 A1* | 4/2007 | Xu | ............... | G06T 7/246 382/103 |
| 2007/0258640 A1* | 11/2007 | Abe | ............... | G06K 9/03 382/159 |
| 2008/0316364 A1 | 12/2008 | Au et al. | | |
| 2009/0022220 A1 | 1/2009 | Vatis et al. | | |
| 2009/0087103 A1* | 4/2009 | Abe | ............... | G06K 9/6203 382/209 |
| 2010/0069742 A1* | 3/2010 | Partain | ............... | A61N 5/1049 600/424 |
| 2010/0118940 A1* | 5/2010 | Yin | ............... | H04N 19/105 375/240.12 |
| 2011/0176611 A1 | 7/2011 | Huang et al. | | |
| 2011/0257708 A1* | 10/2011 | Kramer | ............... | A61N 1/0551 607/62 |
| 2012/0026317 A1* | 2/2012 | Nakahira | ............... | H04N 7/183 348/92 |
| 2013/0148734 A1 | 6/2013 | Nakamura | | |
| 2013/0298670 A1 | 11/2013 | Tsugai et al. | | |
| 2013/0336393 A1* | 12/2013 | Matsumura | ............... | G06T 5/20 375/240.03 |
| 2014/0146890 A1 | 5/2014 | Chiu et al. | | |
| 2016/0286232 A1* | 9/2016 | Li | ............... | H04N 19/513 |

OTHER PUBLICATIONS

Kamp, S., et al., "Multihypothesis Prediction using Decoder Side Motion Vector Derivation in Inter Frame Video Coding" in Proc. SPIE Visual Communication and Image Processing VCIP '09, Jan. 2009, 8 pages.

Kamp, S., et al., "Fast Decoder Side Motion Vector Derivation for Inter Frame Video Coding", IEEE International Picture Coding Symposium PCS '09, May 2009, 5 pages.

Kamp, S., et al., "Decoder-Side Motion Vector Derivation for Hybrid Video Inter Coding", IEEE International Conference on Multimedia and Expo '10, Jul. 2010, 4 pages.

International Search Report issued in Application No. PCT/SE2016/050123 dated Dec. 21, 2016, 6 pages.

Wige, E., et al., "In-Loop Noise-Filtered Prediction for High Efficiency Video Coding", IEEE Transactions on Circuits and Systems for Video Technology, IEEE Service Center, NJ, US jul. 1, 2014, doi: 10.1109/TCSVT.2014.2302377, ISSN 1051-8215, vol. 24, No. 7, Jul. 2014, pp. 1142-1155.

Huiming, T., et al. Motion-Compensated Filtering of Reference Picture for Video Coding, Visual Communications and Image Processing; Jul. 11, 2010-Jul. 14, 2010; Huang Shan, An Hui, 7 pages.

Extended European Search Report dated Jun. 25, 2019, issued in European Patent Application No. 16890800.2, 9 pages.

Sullivan "Future video coding: Joint Exploration Model 1 (JEM1) for future video coding investigation" TD 213 (WP 3/16) ITU-T Draft, Study Period 2013-2016, International Telecommunication Union, Oct. 23, 2015, 20 pages.

Mandal, et al. "Multiresolution motion estimation techniques for video compression" Optical Engineering, Soc. of Photo-Optical Instrumentation Engineers, 1996, vol. 35, No. 1, pp. 128-135.

Suzuki et al. "An Improved Low Delay Inter Frame Coding Using Template Matching Averaging" 28th Picture Coding Symposium, PCS2010, Dec. 8-10, 2010, Nagoya, Japan, 4 pages.

* cited by examiner

METHODS AND DEVICES FOR ENCODING AND DECODING VIDEO PICTURES USING A DENOISED REFERENCE PICTURE

CROSS REFERENCE TO RELATED APPLICATION(S)

This application is a 35 U.S.C. § 371 National Phase Entry Application from PCT/SE2016/050123, filed Feb. 17, 2016, designating the United States, the disclosure of which is incorporated herein in its entirety by reference.

TECHNICAL FIELD

The technology disclosed herein relates generally to the field of digital image processing, and in particular to a method for encoding video pictures, an encoder, a method for decoding video pictures, a decoder, and related computer programs and computer program products.

BACKGROUND

High Efficiency Video Coding (HEVC) is a standardized block-based video codec that utilizes both temporal and spatial prediction. Spatial prediction is achieved using intra prediction from within a current picture, while temporal prediction is achieved using inter prediction or bi-directional inter prediction on block level from previously decoded reference pictures. The difference between the original pixel data and the predicted pixel data, referred to as the residual (or prediction error), is transformed into the frequency domain and quantized and entropy encoded using e.g. context-adaptive variable-length coding (CAVLC) or Context-adaptive binary arithmetic coding (CABAC). The residual is thereafter transmitted to a receiving decoder together with necessary prediction parameters such as mode selections and motion vectors (all being entropy encoded). By quantizing the transformed residuals the tradeoff between bitrate and quality of the video may be controlled, wherein the level of quantization is determined by a quantization parameter (QP). The receiving decoder performs entropy decoding, inverse quantization and inverse transformation to obtain the residual. The decoder then adds the residual to an intra prediction or inter prediction in order to reconstruct a picture.

The Video Coding Experts Group (VCEG) of Telecommunication Standardization Sector of the International Telecommunications Union (ITU-T) has recently started the development of a successor to HEVC. In a first exploration phase, an experimental software codec called Key Technical Areas (KTA) is being used. KTA is based on the HEVC reference codec software HEVC Test Model (HM).

One tool that has been proposed and included in the KTA software is frame-rate up-conversion (FRUC). The FRUC tool is a motion estimation tool that derives the motion information at the decoder side. FRUC has two different modes, template matching and bilateral matching.

Figure 1:
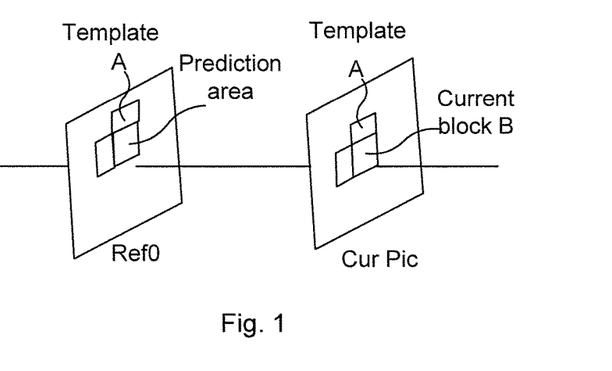
FIG. 1 illustrates the principle of template matching.

FIG. 1 illustrates the principle of template matching. The template matching is a digital image processing technique for finding small parts of an image that matches a template image. A current block B of a current picture is to be decoded and a search image (template A) is therefore selected. The decoder derives a motion vector by matching a template area A of the current picture (denoted Cur Pic) that is neighboring the current block B, with the same template area A in a reference picture (denoted Ref0). The prediction area in the reference picture Ref0 with the best matching template area is selected as the prediction for the current block B.

Figure 2:
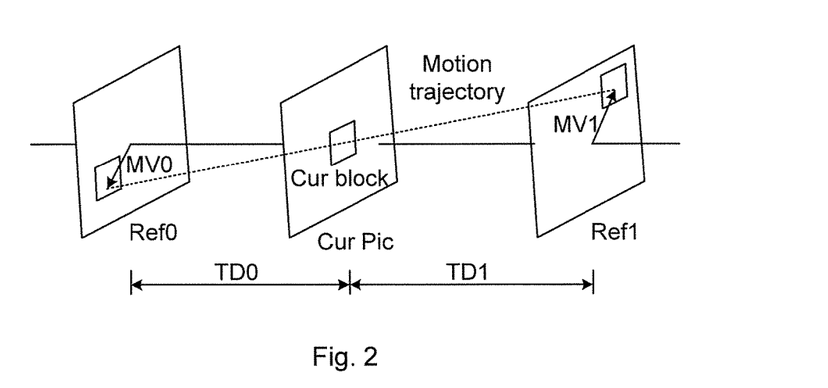
FIG. 2 illustrates the principle of bilateral matching.

FIG. 2 illustrates the principle of bilateral matching. In bilateral matching a block (or picture) is predicted from a previous picture (Ref0) and a following picture (Ref1). A continuous motion trajectory (indicated by a dotted line in the figure) along the current block (denoted Cur block) between two blocks of the reference pictures (Ref0 and Ref1) is assumed to model linear motion. The displacement between a current block and a best matching block is the motion vector. The motion vector between the previous picture Ref0 and the current picture CurPic (the pictures having temporal difference TD0) is indicated by MV0 and the motion vector between the current picture CurPic and following picture Ref1 (the pictures having temporal difference TD1) is indicated by MV1. The motion vectors MV0 and MV1 are proportional to the temporal differences TD0 and TD1. The motion vectors along the motion trajectory that minimizes the prediction error is selected, and their corresponding reference prediction blocks are used to interpolate (or extrapolate) the prediction for the current block of the current picture CurPic.

Natural images captured either with digital cameras or conventional film cameras will pick up noise from a variety of sources such as low number of photons per pixel in the image sensor, dust inside the camera, etc. Further, there exist several types of noise, for instance, salt and pepper noise, which is characterized by the pixels being very different from their surrounding pixels in intensity or color. Another type of noise is Gaussian noise, in which the noise for each pixel in contrast typically just changes by a small amount compared to its original or intended value.

Noisy images may decrease the prediction accuracy in both template matching and bilateral matching since the noise of the pixels tends to change between pictures. Denoising a video in a pre-processing step is one way to address this problem, but it is difficult to balance the amount of noise removal on the one hand and the level of details on the other hand. There is a risk that the picture is denoised too much in some areas resulting in that real details are removed.

Another way to address the problem is to do a rate-distortion decision of filter strengths for a denoising filter at the encoder side and signal the filter strength in the bit stream. This will however cost additional bits that adversely affect the compression efficiency.

There is thus a tradeoff between the amount of noise that can be removed and the level of detail that can be kept, and it is difficult to find a suitable balance.

SUMMARY

An objective of the present teachings is to address the above-mentioned problem and enable an improved prediction accuracy, in particular for matching methods, such as template matching and bilateral matching methods.

The objective is according to an aspect achieved by a method performed in an encoder for encoding video pictures into a video bit stream. The method comprises obtaining a denoised version of a reference picture; performing a matching procedure at least once, the matching procedure comprising matching a reference matching area of the reference picture to a matching area of a second picture and matching a reference matching area of the denoised version to the matching area of the second picture; and encoding a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

An advantage of the method is that the prediction of template matching and bilateral matching is improved by the applying of a denoising filter to the reference area of a reference picture and/or the template area of the current block before performing the matching in order to remove noise. Improved prediction of decoder-side matching means improved compression efficiency since no extra signaling is needed when the matching search is performed both at the encoder and the decoder.

The objective is according to an aspect achieved by a computer program for an encoder for encoding video pictures into a video bit stream. The computer program comprises computer program code, which, when executed on at least one processor on the encoder causes the encoder to perform the method as above.

The objective is according to an aspect achieved by a computer program product comprising a computer program as above and a computer readable means on which the computer program is stored.

The objective is according to an aspect achieved by an encoder for encoding video pictures into a video bit stream. The encoder is configured to: obtain a denoised version of a reference picture; perform a matching procedure at least once, the matching procedure comprising matching a reference matching area of the reference picture to a matching area of a second picture and matching a reference matching area of the denoised version to the matching area of the second picture; and encode a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

The objective is according to an aspect achieved by a method performed in a decoder for decoding video pictures from a video bit stream. The method comprises obtaining a denoised version of a reference picture; performing a matching procedure at least once, the matching procedure comprising matching a reference matching area of the reference picture to a matching area of a second picture and matching a reference matching area of the denoised version to the matching area of the second picture; and decoding a block of the second picture by selecting, for the block, a first prediction area based on a first reference area of the reference picture or a second prediction area based on a second reference area of the denoised version, wherein the prediction area having lowest matching error to the corresponding matching area of the second picture is selected.

The objective is according to an aspect achieved by a computer program for a decoder for decoding video pictures from a video bit stream. The computer program comprises computer program code, which, when executed on at least one processor on the decoder causes the decoder to perform the method as above.

The objective is according to an aspect achieved by a computer program product comprising a computer program as above and a computer readable means on which the computer program is stored.

The objective is according to an aspect achieved by a decoder for decoding video pictures into a video bit stream. The decoder is configured to: obtain a denoised version of a reference picture; perform a matching procedure at least once, the matching procedure comprising matching a reference matching area of the reference picture to a matching area of a second picture and matching a reference matching area of the denoised version to the matching area of the second picture; and decode a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

Further features and advantages of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Denoising or noise reduction is the process of reducing noise in a signal. There are various ways of reducing noise, examples of which are initially given in the following.

Linear smooth filters: Convolutional filters with low-pass or smoothing operations may be used to blur an image. One example of this is the Gaussian blur filter which brings each pixel in closer harmony with its neighboring pixels.

Anisotropic diffusion: With this method the image is smoothed using a smoothing partial differential equation. One version of this is the Gaussian filter, but with a diffusion coefficient designed to detect edges such that the image may be denoised without blurring edges.

Non-local means: Another approach is based on averaging the pixels by non-local averaging of all the pixels in the picture. The amount of weighting for a pixel may be based on the similarity of a small area around that pixel and a small area around the pixel to be denoised.

Temporal filters: Temporal filters may be used in video to average the pixels over time. Motion compensation may be applied to prevent ghosting artifacts when averaging pixels from several pictures.

Non-linear filters: An example of a non-linear denoising filter is the median filter which selects the median value of the neighboring pixels as the value for the pixel to be denoised.

As a note of vocabulary, the term "picture" is used herein. In ITU-T recommendations (e.g. H.265), it is noted that a picture may comprise a frame or a field, but that in one coded video sequence (CVS), either all pictures are frames or all pictures are fields. It may be noted that in the art, the term "frame" is often used interchangeably with the term "picture".

Briefly, the present teachings provide in different embodiments improvements to predictions when using decoder-side matching such as bilateral matching or template matching. This is achieved by applying a denoising filter to a reference area before the (template or bilateral) matching is performed. Several different denoising filters or filter strengths may be tested in the decoder-side matching procedure.

Figure 3:
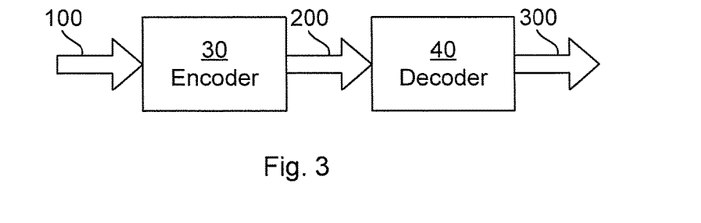
FIG. 3 illustrates schematically an environment in which embodiments disclosed herein can be implemented.

FIG. 3 illustrates schematically an environment in which embodiments disclosed herein may be implemented. An encoder 30 is used to encode an input video stream 100 to a bitstream 200 comprising encoded video. The bitstream 200 is transferred to a decoder 40 e.g. using a wireless or wired connection. The decoder 40 reads and decodes the received bitstream 200 to produce an output video stream 300 which corresponds to the input video stream 100. The encoding can be lossy, whereby the output video stream 300 is not identical to the input video stream 100. The perceived quality loss depends on the bitrate of the bitstream 200: when the bitrate is high, the encoder 30 can produce a bitstream 200 which allows an output video stream 300 with higher quality.

The video encoding/decoding can, for instance, be based on any one of High Efficiency Video Coding (HEVC), Moving Pictures Expert Group (MPEG)-4 H.263, H.264, and MPEG-2. By providing a bitstream with reduced bitrate requirements, the resulting output video 300 can be generated with higher quality. Alternatively (or additionally), less bandwidth is needed for the bitstream 200. It is therefore advantageous to increase encoding efficiency.

Figure 4A:
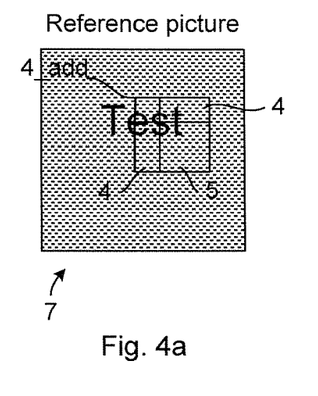
FIGS. 4a, 4b and 4c illustrate an example of denoising for template matching according to embodiments of the present teachings.
Figure 4B:
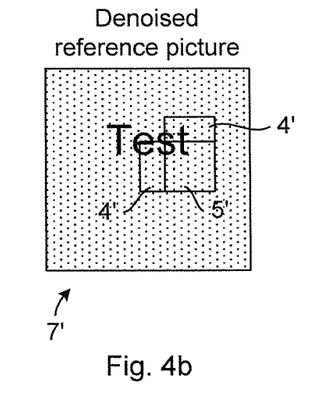
Figure 4C:
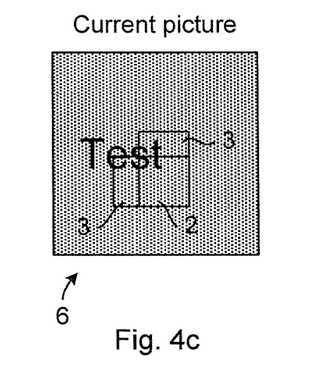

FIGS. 4a, 4b and 4c illustrate an example of denoising for template matching in accordance with embodiments of the present teachings. In particular, FIGS. 4a, 4b and 4c illustrate embodiments, wherein a denoising filter is applied to a reference picture 7. FIG. 4a illustrates a reference picture 7, FIG. 4b illustrates the reference picture 7 when denoised (denoised reference picture having reference numeral 7') and FIG. 4c illustrates a current picture 6. Briefly, a noisy reference picture 7 is denoised resulting in a denoised reference picture 7'. The reference template area(s) 4 of the reference picture 7 and the reference template area(s) 4' of denoised reference picture 7' are each compared to the template area(s) 3 of the current picture 6.

In FIG. 4a the reference picture 7 is intended to be shown as being rather noisy. The reference picture 7 comprises two reference template areas 4, which are adjacent to a prediction area 5. The reference template areas 4 may be used in a matching procedure for finding a prediction for a block 2 of the current picture 6 (FIG. 4c), which block 2 is to be encoded. It is noted that two template areas are used herein purely to describe and exemplify different embodiments. The number of reference template area(s) 4 may in practice be different than the two used herein. FIG. 4a illustrates this by an additional reference template area 4_add, such additional reference template areas may be located anywhere adjacent to the prediction area 5.

In FIG. 4b, a denoised reference picture 7' is shown. The denoised reference picture 7' is a denoised version of the reference picture 7. The denoising may be performed in any known manner, e.g. according to any of the initially mentioned denoising methods (linear smooth filters, anisotropic diffusion etc.).

Figure 5:
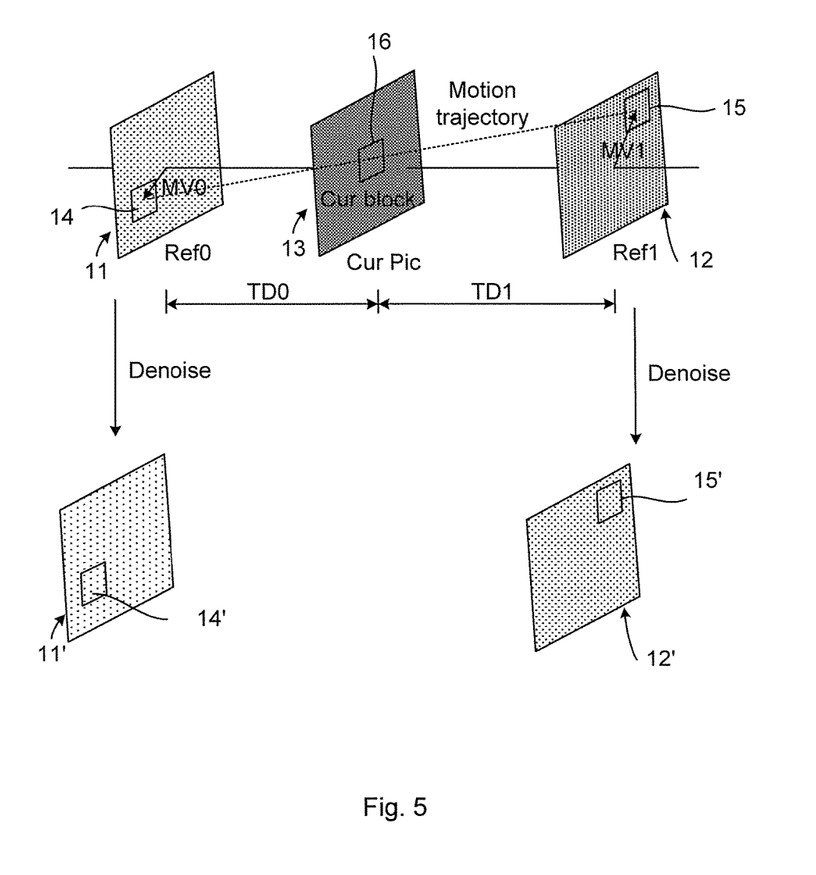
FIG. 5 illustrates an example of denoising for bilateral matching according to embodiments of the present teachings.

After having denoised the reference picture 7, it is tested which of the denoised reference picture 7' and the reference picture 7 that gives the best template match. For this, a template matching procedure, e.g. template matching (as shown in FIGS. 4a, 4b, 4c) or bilateral matching (as shown in FIG. 5), can be made. The reference template areas 4 of the reference picture 7 are matched to the template areas 3 of the current picture 6. The reference template areas 4' of the denoised reference picture 7' are also matched to the template areas 3 of the current picture 6. It is determined which of the reference template areas 4 of the reference picture 7 or the reference template areas 4' of the denoised version of the reference picture 7' that best matches the template areas 3 of the current picture 6. The prediction area 5, 5' corresponding to the best matching reference template areas 4, 4' is used as prediction for the current block 2. That is, the prediction area 5, 5' among the two reference picture versions that gives the best template match is used as prediction for the current block 2. A match may be considered to be the best match e.g. when the Sum of Absolute Differences (SAD) is minimized or the mean squared error (MSE) is minimized for the template area. MSE between a rectangular block I of size m×n pixels and a rectangular block K of size m×n pixels may be calculated according to:

$$MSE = \frac{1}{mn} \sum_{i=0}^{m-1} \sum_{j=0}^{n-1} [I(i, j) - K(i, j)]^2$$

FIG. 5 illustrates an example of denoising for bilateral matching. In this embodiment, in which bilateral matching is used, a previous picture Ref0 (indicated at reference numeral 11), in particular any picture 11 preceding the current picture CurPic (indicated at reference numeral 13) in display order, and a following picture Ref1 (indicated at reference numeral 12), in particular any picture 12 subsequent to the current picture 13 in display order, are denoised in order to obtain denoised versions 11', 12' of them. In another embodiment, for bilateral matching, both the reference pictures 11, 12 are following the current picture 13 in display order but preceding the current picture 13 in decoding order. In yet another embodiment, for bilateral matching, both reference pictures 11, 12 are preceding the current picture 13 both in display order and decoding order. A prediction for the current block 16 of the current picture 13 may then be extrapolated from these two reference pictures 11, 12. In some embodiments, for bilateral matching, only one of the two reference pictures 11, 12 is denoised. Such embodiments may be preferable since the control of the level of denoising is facilitated. Denoising both reference pictures is also conceivable, but care should be taken when selecting filter. If using a too strong filter a best match between them is still obtained, but an interpolated fifth prediction area may have a worse match to the block being encoded. In an extreme case, the two reference pictures are denoised to a level that each consists of only one single color.

The denoising filter type and/or filter strength may be derived in the matching procedure. Once the best match has been found, a prediction for the current block 16 of the current picture 13 may be derived from these matched areas 14, 15 in the reference pictures 11, 12. Alternatively, the same denoising filter that was applied to one of the two reference pictures (e.g. previous picture 11) is also applied to the other reference picture (e.g. subsequent picture 12) before the prediction for the current block 16 is derived from the denoised versions 11', 12' of the reference pictures, at the matched positions. As yet another alternative, the prediction for the current block 16 could be derived from the matching positions, but in the versions 11, 12 of the two reference pictures that have not been denoised, in order to preserve as much as possible of details of the picture (even noise) for the prediction, while ensuring that the best (natural) match is achieved.

In the following various features and embodiments are described, and it is noted that they can be combined with the use of template matching as well as with the use of bilateral matching. Further, the reference numerals refer to FIGS. 4a, 4b, 4c and FIG. 5 for embodiments in which temporal matching and bilateral matching may be used.

Hence, in variations of the embodiments described thus far, giving still further embodiments, two or more different strengths of the denoising filter, alternatively two or more types of denoising filters, are applied to create a set of three or more versions of the reference picture 7, where one version is the not denoised version (i.e. the reference picture 7 for template matching and reference pictures 11, 12 for bilateral matching). The prediction area 5, 5'; 14, 14', 15, 15' of the reference version 7, 7', 11, 11', 12, 12' that gives the best template match, e.g. gives the lowest SAD or MSE, is then selected as the prediction for the block 2 to be encoded for the case of template matching, and selected as the basis for the prediction for the block 16 to be encoded in case of bilateral matching.

Filtering of the reference picture 7, 11, 12 (alignment of samples) can be beneficial, for instance, when the reference area 5, 14, 15 is not a perfect match (not aligned). The denoise filtering and such filtering performed as part of template matching may in some cases be combined into a single filter such that the combined filtering both denoise and produce the desired reference samples for the template matching.

Exemplary denoising filters comprise low-pass filters, linear smoothing filters such as the Gaussian filter, anisotropic diffusion, nonlinear filters such as median filters, temporal filters and non-local averaging of all pixels in an image.

In order to speed up the matching procedure only a subset of the samples could be used for some steps of the matching procedure, e.g. during the first coarse search. To further reduce complexity a coarse search could also use all variants of denoised/not denoised samples or only a subset of the samples but at integer sample accuracy to avoid filtering of the reference samples. A finer search could then refine the reference samples with sub sample accuracy. The notion of motion vector field is used here to denote how the reference samples are positioned with respect to the samples of the current picture.

When the best template match has been determined the prediction area of the denoised (or not denoised) reference picture 7, 7'; 11, 11', 12, 12' is used for predicting the current block 2; 16 of the current picture 6; 13.

Pseudo code describing how the prediction block may be derived on both the encoder and the decoder side when using denoising with template matching is given below:

```
for each block
    for each denoising filter
        apply denoising filter to reference picture
        for each motion vector field
            check match of template between current
            picture and denoised reference picture
            if best match
                store prediction block
```

In the above pseudo code, the "for each denoising filter" should be interpreted as including the case of not using any denoising filter. In some cases, e.g. in some bright blocks, the reference picture might contain no or only little noise, and applying a denoising filter might then give a worse prediction than when using a not denoised version.

In an alternative embodiment for template matching the denoising is applied to both the reference template and the corresponding area in the current picture.

In some embodiments, only the reference template area/areas is/are denoised. For the case of template matching (reference is made to FIGS. 4a and 4b), only the reference template areas 4' are denoised while the rest of the picture 7' is not denoised. The application of the denoising filter only to the reference template areas before the template matching is performed may be done in order to find a better (natural) match as it can be assumed that the noise will change from picture to picture. The not denoised prediction area of the reference picture is used for the prediction. The matching is thus done using the denoised template to make it more probable that the natural motion is tracked. For the prediction, as much as possible of the details are preserved, including the noisy parts.

For the case of bilateral matching (reference is made to FIG. 5), only the matched areas 14, 15 are denoised while the rest of the respective pictures 11, 12 are not denoised. An advantage is that no information is lost in the prediction while still keeping an enhanced natural matching accuracy. Since template matching is not applied on all blocks there is no need to denoise such blocks, which gives advantages such as less processing, faster encoding/decoding and reduced memory bandwidth.

In some embodiments, in order to lower the decoder side complexity when implementing the described method (in the various embodiments), it can be beneficial to perform the matching in lower resolution than the actual coding. For example, the reference picture and template area could be downscaled by a factor of two in both directions, leading to a 75% reduction in the number of pixels to be matched.

In other embodiments, also in order to reduce the decoder side complexity of implementing the described embodiments, a search strategy may be used. For instance, it can be beneficial to perform the matching in two search steps in order to find a best match of search area between current picture and denoised reference picture (denoted the best denoised match). In a first search step, the N best matches for a search region with coarse sample accuracy (for example integer) of the resampled reference samples are selected. In a second step the N best matches are refined using a search region with a final sample accuracy (for example quarter sample) of the resampled reference samples. The prediction for the denoising with the best match in the second step is selected. The matches can be determined for example by using Sum of Absolute Differences (SAD) or weighted SAD. By using weighted SAD it is intended to give a larger weight to coarse samples that are closer to the final samples than to coarse samples that are further away from the final samples.

In alternative embodiments, the first search is performed at both encoder and decoder giving N candidates. Then the second search is only performed for all N candidates at the encoder and the selected candidate is signaled to the decoder when the method is used. The decoder thus only need to perform the second search with final sample accuracy of the reference samples for the selected candidate.

The idea of decoder-side matching such as template matching is to remove the need to signal certain information in the bitstream such as motion vectors and filter strengths. However, there may be a need to signal information such as e.g. when to use template matching and how many filter combinations (filter types/strengths) to test in the matching procedure. This information may be signaled at sequence level such as in Sequence Parameter Set (SPS), picture level such as in Picture Parameter Set (PPS), at slice level or at block level.

In some embodiments, a number of candidate prediction areas are obtained from the template matching. The index for the candidate prediction area to use is then signaled from the encoder to the decoder in the bitstream. Since the steps of the disclosed template matching procedure on the encoder side correspond to the steps at the decoder side, the same set of candidates are derived at the decoder side. Therefore, the encoder can do the matching, and then signal the decoder about which candidate to use. This reduces processing need at the decoder side and may also reduce prediction error.

The features and embodiments that have been described may be combined in different ways, as have been indicated earlier. In the following further examples of various combinations are given.

Figure 6:
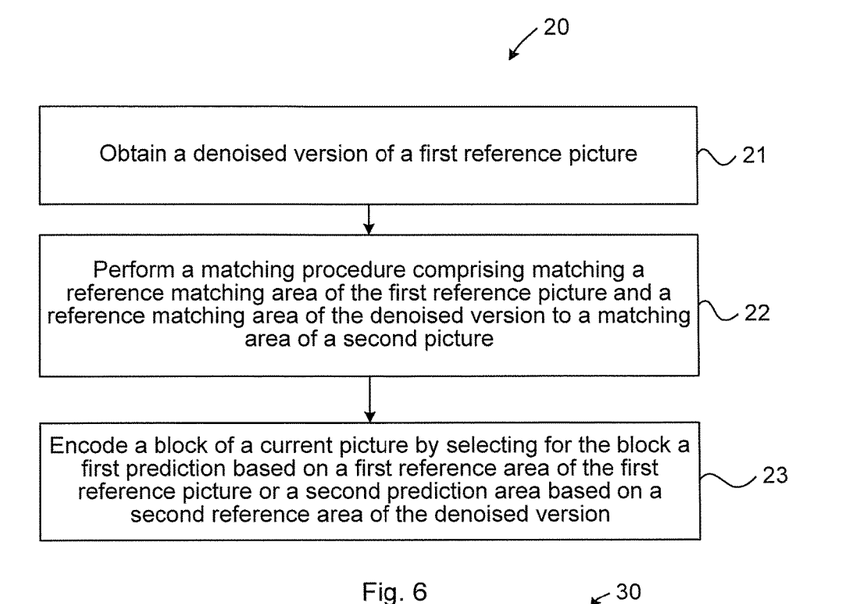
FIG. 6 illustrates a flow chart over steps of a method in an encoder in accordance with the present teachings.

FIG. 6 illustrates a flow chart over steps of a method 20 in an encoder in accordance with the present teachings. The method 20 may be performed in an encoder 30 for encoding video pictures into a video bit stream. The method 20 comprises obtaining 21 a denoised version 7'; 11', 12' of a reference picture 7; 11, 12. It is noted that a denoised version may comprise a picture resulting when denoising the entire reference picture 7; 11, 12, or it may comprise a picture resulting when denoising only part of the reference picture 7; 11, 12. In obtaining the denoised version, any known means may be used, as described earlier. A denoising filter such as low-pass filter may, for instance, be used for obtaining the denoised version.

The method 20 comprises performing 22 a matching procedure at least once, the matching procedure comprising matching a reference matching area 4; 14, 15 of the reference picture 7; 11, 12 to a matching area 3; 16 of a second picture 6; 13 and matching a reference matching area 4'; 14', 15' of the denoised version 7'; 11', 12' to the matching area 3; 16 of the second picture 6; 12, 11. The matching procedure may be, and typically is, performed repeatedly for testing degree of matching between different reference matching areas of the reference picture and the second picture.

The method 20 comprises encoding 23 a block 2; 16 of a current picture 6; 13 by selecting, for the block 2; 16, a first prediction area based on a first reference area 5; 14, 15 of the reference picture 7; 11, 12 or a second prediction area based on a second reference area 4'; 14', 15' of the denoised version 7'; 11', 12', wherein the prediction area having lowest matching error to the corresponding matching area 3; 16 of the second picture 6; 12, 11 is selected.

The method 20 brings about several advantages. By performing a denoising of the reference picture before conducting the (template or bilateral) matching an improved prediction is obtained. Improved prediction of decoder-side matching in turn means improved compression efficiency since no extra signaling is needed when the matching search is performed both in the encoder and the decoder.

The method may be implemented using any of a number of matching procedures. The matching procedure may, for instance, comprise a template matching or a bilateral matching.

When implementing the template matching the method 20 comprises obtaining 21 a denoised version 7' of a first reference picture 7. The reference matching area 4 of the reference picture 7 then comprises a reference template area of the reference picture 7. That is, in the vocabulary of template matching, the reference matching area is known as reference template area. The reference matching area 4' of the denoised version 7' comprises a reference template area of the denoised version 7'. Likewise, the matching area 3 of the second picture 6 comprises a template area of the current picture, i.e. the second picture 6 is the current picture for which a block is to be predicted. Further, in the template matching, the prediction area 5, 5' is neighboring the respective reference template area 4; 4' of the reference picture 7 and the denoised version 7' of the reference picture.

The method 20 comprises performing 22 a matching procedure at least once, the matching procedure comprising matching a reference template area 4 of the reference picture 7 to a template area 3 of a second picture 6 and matching a reference template area 4' of the denoised version 7' to the template area 3 of the second picture 6. The matching procedure may be, and typically is, performed repeatedly for testing degree of matching between different reference matching areas of the reference picture and the denoised version of the reference picture.

The method 20 comprises encoding 23 a block 2 of a current picture 6 by selecting, for the block 2, a first prediction area based on a first reference area 5 of the reference picture 7 or a second prediction area based on a second reference area 5' of the denoised version 7', wherein in the case of template matching, the prediction area is "based on" in the sense that the prediction area is selected to be the prediction area 5 of the reference picture 7 or to be a second prediction area 5' of the denoised version 7'. The prediction area having lowest matching error to the corresponding template area 3 of the current picture 6 is the one selected.

When implementing bilateral matching the method 20 comprises obtaining 21 a denoised version 11', 12' of a reference picture 11, 12. In this embodiment, the second picture 12, 11 comprises a second obtained reference picture 12, 11 or a denoised version (12', 11') of a second obtained reference picture 12, 11. The picture 11 preceding the current picture 13 in display order or the denoised version of the picture 11 preceding the current picture 13 in display order may be compared to the picture 12 following the current picture 13 in display order or the denoised version of the picture 12 following the current picture in display order.

The method 20 comprises performing 22 a bilateral matching at least once, the bilateral matching comprising matching a reference matching area 14, 15 of the reference picture 11, 12 to a matching area 15, 14 of a second picture 12, 11 and matching a reference matching area 14', 15' of the denoised version 11', 12' to the matching area 14, 15 of the second picture 12, 11. Again, the matching procedure may be, and typically is, performed repeatedly for testing degree of matching between different reference matching areas of the reference picture and the second picture.

The method 20 comprises encoding 23 a block 16 of a current picture 13 by selecting, for the block 16, a first prediction area based on a first reference area 14, 15 of the first reference picture 11, 12 or a second prediction area based on a second reference area 14', 15' of the denoised version 11', 12', wherein in the case of bilateral matching, the prediction area is "based on" in the sense that the motion vectors along the motion trajectory that minimizes the prediction error are selected, and their corresponding reference prediction areas are used to interpolate the prediction for the current block 16 of the current picture 13. The prediction area is thus based on these corresponding reference prediction areas. The prediction area having lowest matching error to the corresponding matching area 15 of the second picture 12, 11 is selected.

In the bilateral matching, the encoding 23 may comprise selecting the first prediction area based on the first reference area 14, 15 of the first reference picture 11, 12 or a second prediction area based on a second reference area 14', 15' of the denoised version 11', 12', or a third prediction area 15, 14 of the second reference picture 12, 11 or a fourth prediction area 15', 14' of the denoised version of the second reference picture 12', 11', and deriving a fifth prediction area based on the selected first prediction area 14, 15 and the selected third prediction area 15, 14 or the selected second prediction area 14', 15' and the selected fourth prediction area 15', 14'. The first, second, third and fourth prediction areas may, in the case of bilateral matching, be the same as the matching areas 14, 14', 15, 15'. The fifth prediction area is selected for encoding 23 the block 16 of the current frame 13.

In various embodiments, the obtaining 21 a denoised version 7'; 11', 12' of the first reference picture 7; 11, 12 comprises denoising only the reference matching area 4; 14, 15. As has been described earlier, this may give advantages such as less processing required, faster encoding/decoding and reduced memory bandwidth.

In various embodiments, the method 20 comprises performing 22 the matching procedure in a lower resolution than the encoding. As have been mentioned, this may give a large reduction in number of pixels to be matched.

In various embodiments, the performing the matching procedure comprises obtaining a first set of matches for the reference matching areas 4, 4'; 14, 14', 15, 15' by using a first sample accuracy and refining the matches of the first set using a second sample accuracy, and the encoding 23 then comprises selecting the prediction area among the first set of matches for which the second sample accuracy was used.

In variations of the above embodiment, the method 20 comprises signaling, to a decoder 50, information about a candidate match to use among the first set of matches for which the second sample accuracy was used. This may, for instance, be implemented as an index letting the decoder know which candidate to use, alleviating the decoder from the need to also do the matching in the second sample accuracy.

In various embodiments, the obtaining 21 a denoised version 7'; 11', 12' comprises using a denoising filter selected from: low-pass filters, linear smoothing filters, anisotropic diffusion, nonlinear filters, temporal filters and non-local averaging of all pixels in a picture. Conventionally used and readily available filter implementations may thus be used.

Figure 7:
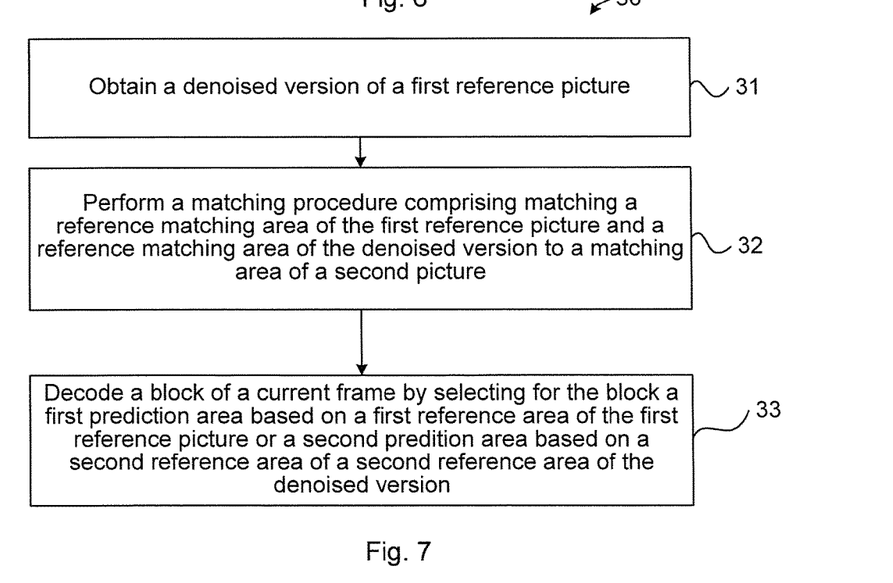
FIG. 7 illustrates a flow chart over steps of a method in a decoder in accordance with the present teachings.

FIG. 7 illustrates a flow chart over steps of a method performed in a decoder in accordance with the present teachings. It is noted that the method 20 in an encoder described with reference to FIG. 6 corresponds to the below method 30 in a decoder 50, and that advantages corresponding to the above given advantages in relation to the encoder method are obtained also for the below decoder method. Therefore, these advantages are not repeated here, and for such advantages reference is made to the above corresponding embodiments.

The method 30 comprises obtaining 31 a denoised version 7'; 11', 12' of a reference picture 7; 11, 12.

The method 30 comprises performing 32 a matching procedure at least once, the matching procedure comprising matching a reference matching area 4; 14, 15 of the reference picture 7; 11, 12 to a matching area 3; 16 of a second picture 6; 13 and matching a reference matching area 4'; 14', 15' of the denoised version 7'; 11', 12' to the matching area 3; 16 of the second picture 6; 12, 11. The matching procedure may be, and typically is, performed repeatedly for testing degree of matching between different reference matching areas of the reference picture and the second picture.

The method 30 comprises decoding 33 a block 2; 16 of a current picture 6; 13 by selecting, for the block 2; 16, a first prediction area based on a first reference area 5; 14, 15 of the first reference picture 7; 11, 12 or a second prediction area based on a second reference area 5'; 14', 15' of the denoised version 7'; 11', 12', wherein the prediction area having lowest matching error to the corresponding matching area 3; 15, 14 of the second picture 6; 12, 11 is selected.

The method may be implemented using any of a number of matching procedures. The matching procedure may, for instance, comprise a template matching or a bilateral matching.

When implementing the template matching the method 30 comprises obtaining 31 a denoised version 7' of a first reference picture 7. The reference matching area 4 of the reference picture 7 then comprises a reference template area of the reference picture 7. That is, in the vocabulary of template matching, the reference matching area is known as reference template area. The reference matching area 4' of the denoised version 7' comprises a reference template area of the denoised version 7'. Likewise, the matching area 3 of the second picture 6 comprises a template area of the current picture, i.e. the second picture 6 is the current picture for which a block is to be predicted. Further, in the template matching, the prediction area 5, 5' is neighboring the respective reference template area 4; 4' of the reference picture 7 and the denoised version 7' of the reference picture.

The method 30 comprises performing 32 a matching procedure at least once, the matching procedure comprising matching a reference template area 4 of the reference picture 7 to a template area 3 of a second picture 6; 13 and matching a reference template area 4' of the denoised version 7' to the template area 3; 16 of the second picture 6; 12, 11. The matching procedure may be, and typically is, performed repeatedly for testing degree of matching between different reference matching areas of the reference picture and the denoised version of the reference picture.

The method 30 comprises decoding 33 a block 2 of a current picture 6 by selecting, for the block 2, a first prediction area based on a template area 5 of the reference picture 7 or a second prediction area based on a second template area 5' of the denoised version 7'. In the case of template matching, the prediction area is "based on" in the sense that the prediction area is selected to be the template area 5 of the reference picture 7 or to be a second template area 5' of the denoised version 7'. The prediction area having lowest matching error to the corresponding template area 3 of the current picture 6 is the one selected.

When implementing bilateral matching the method 30 comprises obtaining 31 a denoised version 11', 12' of a reference picture 11, 12. In this embodiment, the second picture 12, 11 comprises a second obtained reference picture 12, 11 or a denoised version 12', 11' of a second obtained reference picture 12, 11. The picture 11 preceding the current picture 13 or the denoised version of the picture 11 preceding the current picture 13 may be compared to the picture 12 following the current picture 13 or the denoised version of the picture 12 following the current picture.

The method 30 comprises performing 32 a bilateral matching at least once, the bilateral matching comprising matching a reference matching area 14, 15 of the reference picture 11, 12 to a matching area 15, 14 of a second picture 12, 11 and matching a reference matching area 14', 15' of the denoised version 11', 12' to the matching area 14, 15 of the second picture 12, 11. Again, the matching procedure may be, and typically is, performed repeatedly for testing degree of matching between different reference matching areas of the reference picture and the second picture.

The method 30 comprises decoding 33 a block 16 of a current picture 13 by selecting, for the block 16, a first prediction area based on a first reference area 14, 15 of the first reference picture 11, 12 or a second prediction area based on a second reference area 14', 15' of the denoised version 11', 12', wherein in the case of bilateral matching, the prediction area is "based on" in the sense that the motion vectors along the motion trajectory that minimizes the prediction error are selected, and their corresponding reference prediction areas are used to interpolate the prediction for the current block 16 of the current picture 13. The prediction area is thus based on these corresponding reference prediction areas. The prediction area having lowest matching error to the corresponding matching area 15 of the second picture 11, 12 is selected.

In the bilateral matching, the decoding 33 may comprise selecting the first prediction area based on the first reference area 14, 15 of the first reference picture 11, 12 or a second prediction area based on a second reference area 14', 15' of the denoised version 11', 12', or a third prediction area 15, 14 of the second reference picture 12, 11 or a fourth prediction area 15', 14' of the denoised version of the second reference picture 12', 11' and deriving a fifth prediction area based on the selected first prediction area 14, 15 and the selected third prediction area 15, 14 or the selected second prediction area 14', 15' and the selected fourth prediction area 15', 12'. The first, second, third and fourth prediction areas may, in the case of bilateral matching, be the same as the matching areas 14, 14', 15, 15'. The fifth prediction area is selected for decoding (33) the block (16) of the current frame (13).

In various embodiments, the obtaining 31 a denoised version 7'; 11', 12' of the first reference picture 7; 11, 12 comprises denoising only the reference matching area 4; 14, 15.

In various embodiments, the method 30 comprises performing 32 the matching procedure in a lower resolution than the decoding.

In various embodiments, the performing the matching procedure comprises obtaining a first set of matches for the reference matching areas 4, 4'; 14, 14', 16, 16' by using a first sample accuracy and refining the matches of the first set using a second sample accuracy, and the decoding 33 then comprises selecting the prediction area among the first set of matches for which the second sample accuracy was used.

In variations of the above embodiment, the method 30 comprises receiving, from an encoder 40, information about a candidate match to use among the first set of matches for which the second sample accuracy was used. This may, for instance, be implemented as an index letting the decoder know which candidate to use, alleviating the decoder from the need to also do the matching.

In various embodiments, the obtaining 31 a denoised version 7'; 11', 12' comprises using a denoising filter selected from: low-pass filters, linear smoothing filters, anisotropic diffusion, nonlinear filters, temporal filters and non-local averaging of all pixels in a picture.

Figure 8:
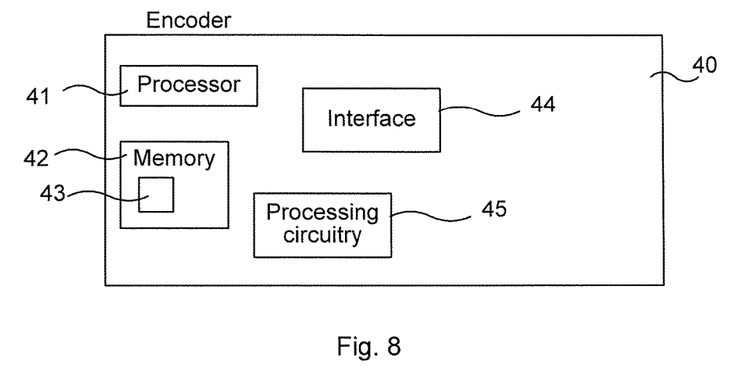
FIG. 8 illustrates schematically an encoder and means for implementing embodiments according to the present teachings.

FIG. 8 illustrates schematically an encoder 40 and means for implementing embodiments in accordance with the present teachings. The encoder 40 comprises a processor 41 comprising any combination of one or more of a central processing unit (CPU), multiprocessor, microcontroller, digital signal processor (DSP), application specific integrated circuit etc. capable of executing software instructions stored in a memory 42 which can thus be a computer program product. The processor 41 of the encoder 40 can be configured to execute any of the various embodiments of the method 20 for instance as described in relation to FIG. 6.

The memory 42 can be any combination of read and write memory (RAM) and read only memory (ROM), Flash memory, magnetic tape, Compact Disc (CD)-ROM, digital versatile disc (DVD), Blu-ray disc etc. The memory 42 may also comprise persistent storage, which, for example, can be any single one or combination of magnetic memory, optical memory, solid state memory or even remotely mounted memory.

The encoder 40 comprises an interface 44 for communication with other devices. The interface 44 may, for instance, comprise e.g. protocol stacks etc., for communication with other devices, and also an interface for communication with a decoder.

The encoder 40 may comprise additional processing circuitry, schematically indicated at reference numerals 45, for implementing the various embodiments according to the present teachings.

An encoder 40 is provided for encoding video pictures into a video bit stream. The encoder 40 is configured to:

obtain a denoised version 7'; 11', 12' of a reference picture 7; 11, 12, perform a matching procedure at least once, the matching procedure comprising matching a reference matching area 4; 14, 15 of the reference picture 7; 11, 12 to a matching area 3; 15, 14 of a second picture 6; 12, 11 and matching a reference matching area 4'; 14', 15' of the denoised version 7'; 11', 12' to the matching area 3; 15, 14 of the second picture 6; 12, 11, and encode a block 2; 16 of a current picture 6; 13 by selecting, for the block 2; 16, a first prediction area based on a first reference area 5; 14, 15 of the reference picture 7; 11, 12 or a second prediction area based on a second reference area 5'; 14', 15' of the denoised version 7'; 11', 12', wherein the prediction area having lowest matching error to the corresponding matching area 3; 15, 14 of the second picture 11, 12 is selected.

The encoder 40 may be configured to perform the above steps e.g. by comprising one or more processors 41 and memory 42, the memory 42 containing instructions executable by the processor 41, whereby the encoder 40 is operative to perform the steps.

In an embodiment, the encoder 40 is configured to obtain a denoised version 7'; 11', 12' of the reference picture 7; 11, 12 by denoising only the reference matching area 4; 14, 15.

In an embodiment, the encoder 40 is configured to perform the matching procedure in a lower resolution than the encoding.

In an embodiment, the encoder 40 is configured to perform the matching procedure by obtaining a first set of matches for the reference matching areas 4, 4'; 14, 14', 15, 15' by using a first sample accuracy and configured to refine the matches of the first set using a second sample accuracy, and configured to encode by selecting the prediction area among the first set of matches for which the second sample accuracy was used.

In a variation of the above embodiment, the encoder 40 is configured to signal, to a decoder 50, information about a candidate match to use among the first set of matches for which the second sample accuracy was used.

In an embodiment, the encoder 40 is configured to obtain a denoised version 7'; 11', 12' by using a denoising filter selected from: low-pass filters, linear smoothing filters, anisotropic diffusion, nonlinear filters, temporal filters and non-local averaging of all pixels in a picture.

In an embodiment, the matching procedure comprises a template matching, and wherein:
  the reference matching area 4 of the first reference picture 7 comprises a reference template area of a reference picture 7,
  the reference matching area 4' of the denoised version 7' comprises a reference template area of the denoised version 7',
  the second picture 6 comprises the current picture,
  the matching area 3 of the second picture 6 comprises a template area of the current picture, and
  the prediction area 5, 5' is neighboring the respective template area 4; 4' of the reference picture 7 and the denoised version 7'.

In an embodiment, the second picture 12, 11 comprises a second obtained reference picture 11, 12 or a denoised version of a second obtained reference picture 11', 12',
  wherein the encoder 40 is configured to, during the encoding the block 16:
  select a third prediction area 15, 14 of the second reference picture 12, 11 or a fourth prediction area 15', 14' of the denoised version 12', 11' of the second reference picture 12, 11,
  deriving a fifth prediction area based on the selected first prediction area 14, 15 and the selected third prediction area 15, 14 or the selected second prediction area 14', 15' and the selected fourth prediction area 15', 14', and
  select the fifth prediction area for encoding the block 16 of the current picture 13.

In an embodiment, an encoder is provided for encoding video pictures into a video bit stream. The encoder comprises one or more processors and memory, the memory containing instructions executable by the processor, whereby the encoder is operative to:
  obtain a denoised version 7'; 11', 12' of a reference picture 7; 11, 12,
  perform a matching procedure at least once, the matching procedure comprising matching a reference matching area 4; 14, 15 of the reference picture 7; 11, 12 to a matching area 3; 15, 14 of a second picture 6; 12, 11 and matching a reference matching area 4'; 14', 15' of the denoised version 7'; 11', 12' to the matching area 3; 15, 14 of the second picture 6; 12, 11, and
  encode a block 2; 16 of a current picture 6; 13 by selecting, for the block 2; 16, a first prediction area based on a first reference area 5; 14, 15 of the reference picture 7; 11, 12 or a second prediction area based on a second reference area 5'; 14', 15' of the denoised version 7'; 11', 12', wherein the prediction area having lowest matching error to the corresponding matching area 3; 15, 14 of the second picture 6; 14, 15 is selected.

The present teachings also encompass a computer program 43 for an encoder 40 for encoding video pictures into a video bit stream. The computer program 43 comprises computer program code, which, when executed on at least one processor on the encoder 40 causes the encoder 40 to perform the method 20 according to any of the described embodiments.

The present teachings also encompasses computer program products 42 comprising a computer program 43 for implementing the embodiments of the method as described, and a computer readable means on which the computer program 43 is stored. The computer program product, or the memory, thus comprises instructions executable by the processor 41. Such instructions may be comprised in a computer program, or in one or more software modules or function modules. The computer program product 42 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 9:
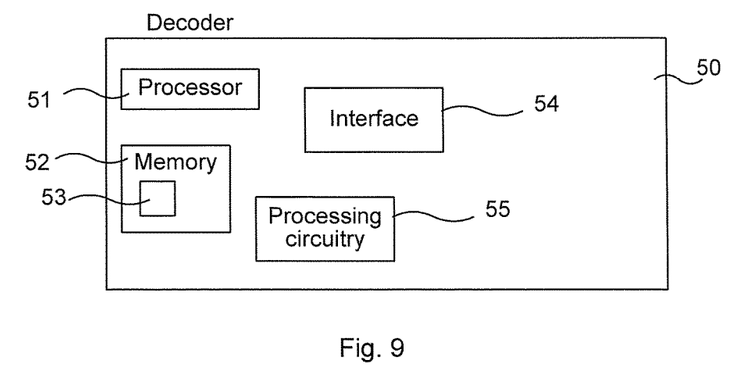
FIG. 9 illustrates schematically a decoder and means for implementing embodiments according to the present teachings.

FIG. 9 illustrates schematically a decoder 50 and means for implementing embodiments in accordance with the present teachings. The decoder 50 comprises a processor 51 comprising any combination of one or more of a central processing unit (CPU), multiprocessor, microcontroller, digital signal processor (DSP), application specific integrated circuit etc. capable of executing software instructions stored in a memory 52 which can thus be a computer program product. The processor 51 of the decoder 50 can be configured to execute any of the various embodiments of the method 30 for instance as described in relation to FIG. 7.

The memory 52 can be any combination of read and write memory (RAM) and read only memory (ROM), Flash memory, magnetic tape, Compact Disc (CD)-ROM, digital versatile disc (DVD), Blu-ray disc etc. The memory 52 may also comprise persistent storage, which, for example, can be any single one or combination of magnetic memory, optical memory, solid state memory or even remotely mounted memory.

The decoder 50 comprises an interface 54 for communication with other devices. The interface 54 may, for instance, comprise e.g. protocol stacks etc., for communication with other devices, and also an interface for communication with a decoder.

The decoder 50 may comprise additional processing circuitry, schematically indicated at reference numerals 55, for implementing the various embodiments according to the present teachings.

A decoder 50 is provided for decoding video pictures into a video bit stream. The decoder 50 is configured to:
  obtain a denoised version 7'; 11', 12' of a reference picture 7; 11, 12,
  perform a matching procedure at least once, the matching procedure comprising matching a reference matching area 4; 14, 15 of the reference picture 7; 11, 12 to a matching area 3; 15, 14 of a second picture 6; 12, 11 and matching a reference matching area 4'; 14', 15' of the denoised version 7'; 11', 12' to the matching area 3; 15, 14 of the second picture 6; 12, 11, and decode a block 2; 16 of a current picture 6; 13 by selecting, for the block 2; 16, a first prediction area based on a first reference area 5; 14, 15 of the reference picture 7; 11, 12 or a second prediction area based on a second reference area 5'; 14', 15' of the denoised version 7'; 11', 12', wherein the prediction area having lowest matching error to the corresponding matching area 3; 15, 14 of the second picture 6; 12, 11 is selected.

The decoder 50 may be configured to perform the above steps e.g. by comprising one or more processors 51 and memory 52, the memory 52 containing instructions executable by the processor 51, whereby the decoder 50 is operative to perform the steps.

In an embodiment, the decoder 50 is configured to obtain a denoised version 7'; 11', 12' of the reference picture 7; 11, 12 by denoising only the reference matching area 4; 14, 15.

In an embodiment, the decoder 50 is configured to perform the matching procedure in a lower resolution than the decoding.

In various embodiments, the decoder 50 is configured to perform the matching procedure by obtaining a first set of matches for the reference matching areas 4, 4'; 14, 14', 15, 15' by using a first sample accuracy and configured to refine the matches of the first set using a second sample accuracy, and configured to decode by selecting the prediction area among the first set of matches for which the second sample accuracy was used.

In an embodiment, the decoder 50 is configured to receive, from an encoder 40, information about a candidate match to use among the first set of matches for which the second sample accuracy was used.

In an embodiment, the decoder 50 is configured to the obtain a denoised version 7'; 11', 12' by using a denoising filter selected from: low-pass filters, linear smoothing filters, anisotropic diffusion, nonlinear filters, temporal filters and non-local averaging of all pixels in a picture.

In an embodiment, the matching procedure comprises a template matching, and wherein:
the reference matching area 4 of the first reference picture 7 comprises a reference template area of a reference picture 7,
the reference matching area 4' of the denoised version 7' comprises a reference template area of the denoised version 7',
the second picture 6 comprises the current picture,
the matching area 3 of the second picture 6 comprises a template area of the current picture, and
the prediction area 5, 5' is neighboring the respective template area 4; 4' of the reference picture 7 and the denoised version 7'.

In an embodiment, the matching procedure comprises a bilateral matching, and wherein:
the second picture 12, 11 comprises a second obtained reference picture 12, 11 or a denoised version of a second obtained reference picture 12', 11'
wherein the decoder 50 is configured to, during the decoding the block 16:
select a third prediction area 15, 14 of the second reference picture 12, 11 or a fourth prediction area 15', 14' of the denoised version 12', 11' of the second reference picture 12, 11,
derive a fifth prediction area based on the selected first prediction area 14, 15 and the selected third prediction area 15, 14 or the selected second prediction area 14', 15' and the selected fourth prediction area 15', 14', and
select the fifth prediction area for decoding the block 16 of the current picture 13.

In an embodiment, a decoder is provided for decoding video pictures into a video bit stream. The decoder comprises one or more processors and memory, the memory containing instructions executable by the processor, whereby the decoder is operative to:
obtain a denoised version 7'; 11', 12' of a reference picture 7; 11, 12,
perform a matching procedure at least once, the matching procedure comprising matching a reference matching area 4; 14, 15 of the reference picture 7; 11, 12 to a matching area 3; 15, 14 of a second picture 6; 12, 11 and matching a reference matching area 4'; 14', 15' of the denoised version 7'; 11', 12' to the matching area 3; 15, 14 of the second picture 6; 12, 11, and
decode a block 2; 16 of a current picture 6; 13 by selecting, for the block 2; 16, a first prediction area based on a first reference area 5; 14, 15 of the reference picture 7; 11, 12 or a second prediction area of a second reference area 5'; 14', 15' of the denoised version 7'; 11', 12', wherein the prediction area having lowest matching error to the corresponding matching area 3; 15, 14 of the second picture 6; 14, 15 is selected.

The present teachings also encompass a computer program 53 for a decoder 50 for decoding video pictures into a video bit stream. The computer program 53 comprises computer program code, which, when executed on at least one processor on the decoder 50 causes the decoder 50 to perform the method 30 according to any of the described embodiments.

The present teachings also encompasses computer program products 52 comprising a computer program 53 for implementing the embodiments of the method as described, and a computer readable means on which the computer program 53 is stored. The computer program product, or the memory, thus comprises instructions executable by the processor 51. Such instructions may be comprised in a computer program, or in one or more software modules or function modules. The computer program product 52 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 10:
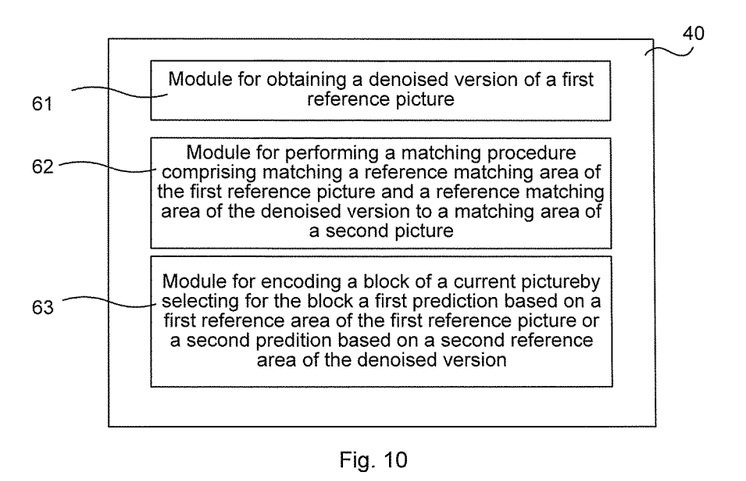
FIG. 10 illustrates an encoder comprising function modules/software modules for implementing embodiments according to the present teachings.

FIG. 10 illustrates an encoder comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described.

An encoder is provided for encoding video pictures into a video bit stream. The encoder comprises a first module 61 for obtaining a denoised version of a reference picture. Such first module 61 may for instance comprise processing circuitry adapted to denoise reference pictures.

The encoder comprises a second module 62 for performing a matching procedure at least once, the matching procedure comprising matching a reference matching area of the reference picture to a matching area of a second picture and matching a reference matching area of the denoised version to the matching area of the second picture. Such second module 62 may for instance comprise processing circuitry adapted to perform a matching procedure.

The encoder comprises a third module 63 for encoding a block of a current picture by selecting, for the block, a first prediction area based on a first reference area of the reference picture or a second prediction area based on a second reference area of the denoised version, wherein the prediction area having lowest matching error to the corresponding matching area of the second picture is selected. Such third module 63 may, for instance, comprise processing circuitry adapted for encoding of blocks.

It is noted that one or more of the modules 61, 62, 63 may be replaced by units.

Figure 11:
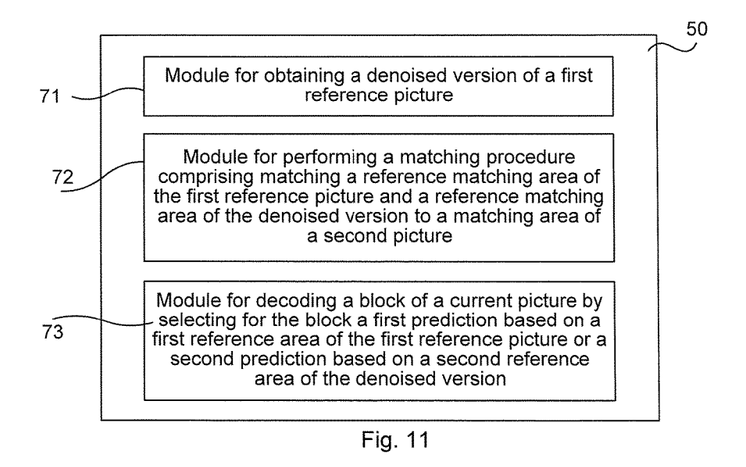
FIG. 11 illustrates a decoder comprising function modules/software modules for implementing embodiments according to the present teachings.

FIG. 11 illustrates a decoder comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described.

A decoder is provided for decoding video pictures into a video bit stream. The decoder comprises a first module 71 for obtaining a denoised version of a reference picture. Such first module 71 may for instance comprise processing circuitry adapted to denoise reference pictures.

The decoder comprises a second module 72 for performing a matching procedure at least once, the matching procedure comprising matching a reference matching area of the reference picture to a matching area of a second picture and matching a reference matching area of the denoised version to the matching area of the second picture. Such second module 72 may for instance comprise processing circuitry adapted to perform a matching procedure.

The decoder comprises a third module 73 for decoding a block of a current picture by selecting, for the block, a first prediction area based on a first reference area of the reference picture or a second prediction area based on a second reference area of the denoised version, wherein the prediction area having lowest matching error to the corresponding matching area of the second picture is selected. Such third module 73 may, for instance, comprise processing circuitry adapted for decoding of blocks.

It is noted that one or more of the modules 71, 72, 73 may be replaced by units.

The described encoder and decoder may be implemented in different ways as have been described. They may, for instance, be implemented as downloadable instructions to be run on a processor, e.g. downloadable in the form of application program or application software (commonly known as an "app"). The encoder and decoder may, for instance, be implemented in (e.g. be downloaded to) a camera, a tablet, a set-top box, a personal computer, smart phone or any device wherein encoding and/or decoding is needed. In other embodiments, the encoder and decoder are implemented in hardware or hardware and software in such device.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in an encoder for encoding video pictures into a video bit stream, the method comprising:

obtaining a denoised version of a reference picture, wherein obtaining the denoised version of the reference picture comprises denoising only a reference matching area within the reference picture;

after obtaining the denoised version of the reference picture, performing a matching procedure at least once, the matching procedure comprising: (1) matching the reference matching area of the reference picture to a corresponding matching area of a second picture, and (2) matching the denoised reference matching area of the denoised version of the reference picture to the corresponding matching area of the second picture; and encoding a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

2. The method as claimed in claim 1, comprising performing the matching procedure in a lower resolution than the encoding.

3. The method as claimed in claim 1, wherein the performing the matching procedure comprises obtaining a first set of matches for the reference matching areas by using a first sample accuracy and refining the matches of the first set using a second sample accuracy, and wherein the encoding comprises selecting the prediction area among the first set of matches for which the second sample accuracy was used.

4. The method as claimed in claim 3, comprising signaling, to a decoder, information about a candidate match to use among the first set of matches for which the second sample accuracy was used.

5. The method as claimed in claim 1, wherein the obtaining a denoised version comprises using a denoising filter selected from: low-pass filters, linear smoothing filters, anisotropic diffusion, nonlinear filters, temporal filters and non-local averaging of all pixels in a picture.

6. The method as claimed in claim 1, wherein the matching procedure comprises a template matching, and wherein:

the reference matching area of the first reference picture comprises a reference template area of a reference picture;

the reference matching area of the denoised version comprises a reference template area of the denoised version;

the second picture comprises the current picture;

the matching area of the second picture comprises a template area of the current picture; and the prediction area is neighboring the respective template area of the reference picture and the denoised version.

7. The method as claimed in claim 1, wherein the matching procedure comprises a bilateral matching, and wherein:

the second picture comprises a second obtained reference picture or a denoised version of a second obtained reference picture;

wherein the method comprises, during the encoding the block:

selecting a third prediction area of the second reference picture or a fourth prediction area of the denoised version of the second reference picture;

deriving a fifth prediction area based on the selected first prediction area and the selected third prediction area or the selected second prediction area and the selected fourth prediction area; and selecting the fifth prediction area for encoding the block of the current frame.

8. A computer program for an encoder for encoding video pictures into a video bit stream, the computer program comprising computer program code, which, when executed on at least one processor on the encoder causes the encoder to perform the method according to claim 1.

9. A non-transitory computer program product comprising a computer program for an encoder for encoding video pictures into a video bit stream, the computer program comprising computer program code, which, when executed on at least one processor on the encoder causes the encoder to perform the method according to claim 1.

10. An encoder for encoding video pictures into a video bit stream, the encoder being configured to:
   obtain a denoised version of a reference picture, wherein obtaining the denoised version of the reference picture comprises denoising only a reference matching area within the reference picture;
   after obtaining the denoised version of the reference picture, perform a matching procedure at least once, the matching procedure comprising: (1) matching the reference matching area of the reference picture to a corresponding matching area of a second picture, and (2) matching the denoised reference matching area of the denoised version of the reference picture to the corresponding matching area of the second picture; and
   encode a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

11. The encoder as claimed in claim 10, configured to perform the matching procedure in a lower resolution than the encoding.

12. The encoder as claimed in claim 10, configured to perform the matching procedure by obtaining a first set of matches for the reference matching areas by using a first sample accuracy and configured to refine the matches of the first set using a second sample accuracy, and configured to encode by selecting the prediction area among the first set of matches for which the second sample accuracy was used.

13. The encoder as claimed in claim 12, configured to signal, to a decoder, information about a candidate match to use among the first set of matches for which the second sample accuracy was used.

14. The encoder as claimed in claim 10, configured to obtain a denoised version by using a denoising filter selected from: low-pass filters, linear smoothing filters, anisotropic diffusion, nonlinear filters, temporal filters and non-local averaging of all pixels in a picture.

15. The encoder as claimed in claim 10, wherein the matching procedure comprises a template matching, and wherein:
   the reference matching area of the first reference picture comprises a reference template area of a reference picture;
   the reference matching area of the denoised version comprises a reference template area of the denoised version;
   the second picture comprises the current picture;
   the matching area of the second picture comprises a template area of the current picture; and
   the prediction area is neighboring the respective template area of the reference picture and the denoised version.

16. The encoder as claimed in claim 10, wherein the matching procedure comprises a bilateral matching, and wherein:
   the second picture comprises a second obtained reference picture or a denoised version of a second obtained reference picture;
   wherein the encoder is configured to, during the encoding the block:
      select a third prediction area of the second reference picture or a fourth prediction area of the denoised version of the second reference picture;
      derive a fifth prediction area based on the selected first prediction area and the selected third prediction area or the selected second prediction area and the selected fourth prediction area; and
      select the fifth prediction area for encoding the block of the current frame.

17. A method performed in a decoder for decoding video pictures from a video bit stream, the method comprising:
   obtaining a denoised version of a reference picture, wherein obtaining the denoised version of the reference picture comprises denoising only a reference matching area within the reference picture;
   after obtaining the denoised version of the reference picture, performing a matching procedure at least once, the matching procedure comprising: (1) matching the reference matching area of the reference picture to a corresponding matching area of a second picture, and (2) matching the denoised reference matching area of the denoised version of the reference picture to the corresponding matching area of the second picture; and
   decoding a block of the second picture by selecting, for the block, a first prediction area based on a first reference area of the reference picture or a second prediction area based on a second reference area of the denoised version, wherein the prediction area having lowest matching error to the corresponding matching area of the second picture is selected.

18. The method as claimed in claim 17, comprising performing the matching procedure in a lower resolution than the decoding.

19. The method as claimed in claim 17, wherein the performing the matching procedure comprises obtaining a first set of matches for the reference matching areas by using a first sample accuracy and refining the matches of the first set using a second sample accuracy, and wherein the decoding comprises selecting the prediction area among the first set of matches for which the second sample accuracy was used.

20. The method as claimed in claim 19, comprising receiving, from an encoder, information about a candidate match to use among the first set of matches for which the second sample accuracy was used.

21. The method as claimed in claim 17, wherein the obtaining a denoised version comprises using a denoising filter selected from: low-pass filters, linear smoothing filters, anisotropic diffusion, nonlinear filters, temporal filters and non-local averaging of all pixels in a picture.

22. The method as claimed in claim 17, wherein the matching procedure comprises a template matching, and wherein:
   the reference matching area of the first reference picture comprises a reference template area of a reference picture;
   the reference matching area of the denoised version comprises a reference template area of the denoised version;

the second picture comprises the current picture;
the matching area of the second picture comprises a template area of the current picture; and
the prediction area is neighboring the respective template area of the reference picture and the denoised version.

23. The method as claimed in claim 17, wherein the matching procedure comprises a bilateral matching and wherein:
the second picture comprises a second obtained reference picture or a denoised version of a second obtained reference picture;
wherein the method comprises, during the decoding the block:
selecting a third prediction area of the second reference picture or a fourth prediction area of the denoised version of the second reference picture;
deriving a fifth prediction area based on the selected first prediction area and the selected third prediction area or the selected second prediction area and the selected fourth prediction area; and
selecting the fifth prediction area for decoding the block of the current frame.

24. A computer program for a decoder for decoding video pictures from a video bit stream, the computer program comprising computer program code, which, when executed on at least one processor on the decoder causes the decoder to perform the method according to claim 17.

25. A non-transitory computer program product comprising a computer program for a decoder for decoding video pictures from a video bit stream, the computer program comprising computer program code, which, when executed on at least one processor on the decoder cause the decoder to perform the method according to claim 17.

26. A decoder for decoding video pictures into a video bit stream, the decoder being configured to:
obtain a denoised version of a reference picture, wherein obtaining the denoised version of the reference picture comprises denoising only a reference matching area within the reference picture;
after obtaining the denoised version of the reference picture, perform a matching procedure at least once, the matching procedure comprising: (1) matching the reference matching area of the reference picture to a corresponding matching area of a second picture, and (2) matching the denoised reference matching area of the denoised version of the reference picture to the corresponding matching area of the second picture; and
decode a block of a current picture by selecting, for the block, a first prediction area based on a first reference area of the reference picture or a second prediction area based on a second reference area of the denoised version, wherein the prediction area having lowest matching error to the corresponding matching area of the second picture is selected.

27. The decoder as claimed in claim 26, configured to perform the matching procedure in a lower resolution than the decoding.

28. The decoder as claimed in claim 26, configured to perform the matching procedure by obtaining a first set of matches for the reference matching areas by using a first sample accuracy and configured to refine the matches of the first set using a second sample accuracy, and configured to decode by selecting the prediction area among the first set of matches for which the second sample accuracy was used.

29. The decoder as claimed in claim 28, configured to receive, from an encoder, information about a candidate match to use among the first set of matches for which the second sample accuracy was used.

30. The decoder as claimed in claim 26, configured to obtain a denoised version by using a denoising filter selected from: low-pass filters, linear smoothing filters, anisotropic diffusion, nonlinear filters, temporal filters and non-local averaging of all pixels in a picture.

31. The decoder as claimed in claim 10, wherein the matching procedure comprises a template matching, and wherein:
the reference matching area of the first reference picture comprises a reference template area of a reference picture;
the reference matching area of the denoised version comprises a reference template area of the denoised version;
the second picture comprises the current picture;
the matching area of the second picture comprises a template area of the current picture; and
the prediction area is neighboring the respective template area of the reference picture and the denoised version.

32. The decoder as claimed in claim 10, wherein the matching procedure comprises a bilateral matching, and wherein:
the second picture comprises a second obtained reference picture or a denoised version of a second obtained reference picture;
wherein the decoder is configured to, during the decoding the block:
select a third prediction area of the second reference picture or a fourth prediction area of the denoised version of the second reference picture;
derive a fifth prediction area based on the selected first prediction area and the selected third prediction area or the selected second prediction area and the selected fourth prediction area; and
select the fifth prediction area for decoding the block of the current frame.

33. The method as claimed in claim 1, further comprising:
obtaining a denoised version of the second picture, wherein obtaining the denoised version of the second picture comprises denoising the corresponding matching area of the second picture.

* * * * *